(Model.)
K. ANUNSEN.
HARROW.
No. 274,249. Patented Mar. 20, 1883.
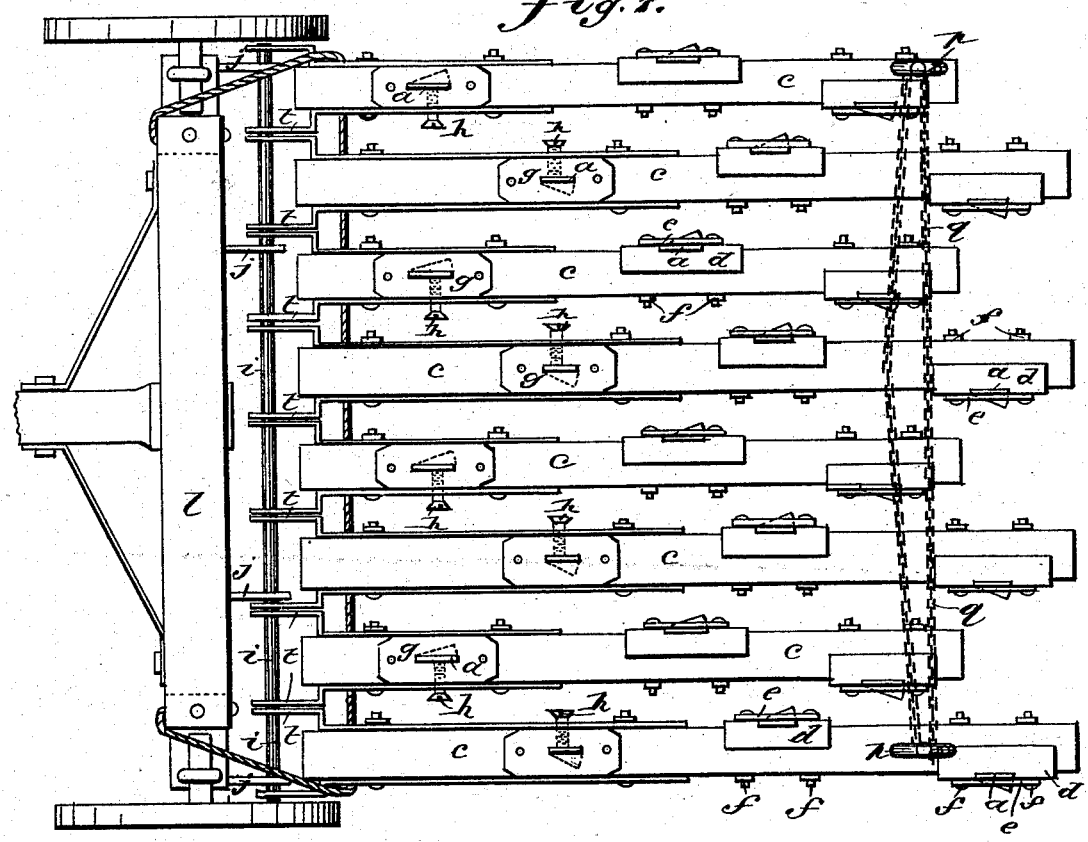
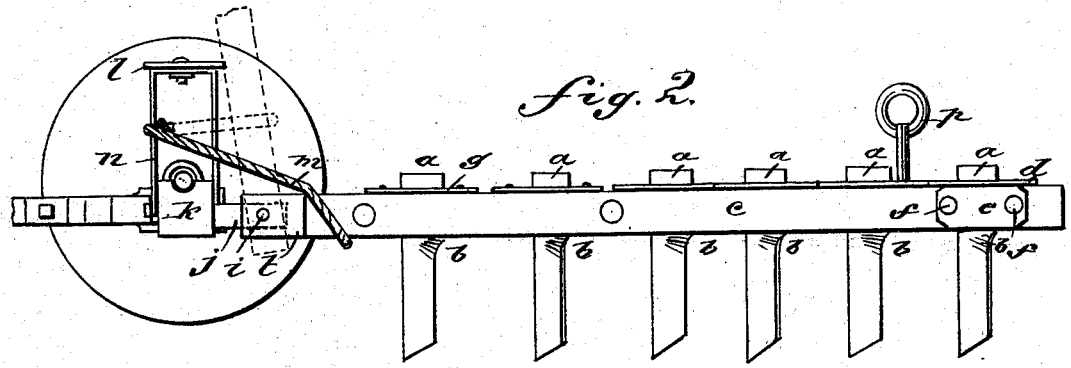
WITNESSES:
Otto Beyer
C. Sedgwick
INVENTOR:
K. Anunsen
BY Munn & Co.
ATTORNEYS.

UNITED STATES PATENT OFFICE.

KITTIL ANUNSEN, OF WINCHESTER, WISCONSIN.

HARROW.

SPECIFICATION forming part of Letters Patent No. 274,249, dated March 20, 1883.

Application filed September 8, 1882. (Model.)

*To all whom it may concern:*

Be it known that I, KITTIL ANUNSEN, of Winchester, in the county of Winnebago and State of Wisconsin, have invented a new and improved Harrow, of which the following is a full, clear, and exact description.

The invention consists in combining the parts of a harrow, as hereinafter described.

Reference is to be had to the accompanying drawings, forming part of this specification, in which similar letters of reference indicate corresponding parts in all the figures.

Figure 1 is a plan view of my improved harrow. Fig. 2 is a side elevation, and Fig. 3 is a perspective view of a harrow-tooth of the form that I propose to employ.

I propose to use flat plates or bars of thin steel, $a$, for the teeth—say about three-sixteenths of an inch thick, three inches wide, and of any suitable length—making an offset or twist, $b$, at or below where the plates connect with the beams $c$, so that the plane of the teeth will be oblique to the line of the draft when the teeth are attached, to turn a furrow to one side, half the number being twisted to the right and half to the left, so that the harrow will not be crowded sidewise, and the front edges being thin and sharp. These teeth I connect to the bars mainly by clamping the upper ends between angle-plates $d$, placed on the sides of the bars $c$, and notched to form shoulders for the teeth, and the cleats $e$, secured by bolts $f$ going through the beams; but some are secured in mortises through the beams and a top plate, $g$, by set-screws $h$. I prefer to attach one tooth to each side and one at the middle of the beam, and to arrange the beams at suitable distances apart to make the distances from the teeth of one bar to those of another the same as between the teeth of one bar. The teeth so arranged make wide furrows, throwing the earth right and left to a considerable extent, and at the same time draw much easier than the narrower and thicker teeth.

The beams are pivoted by means of metal plates $t$, attached to their sides, to the rod $i$, fixed in arms $j$, extending rearward from the truck-axle $k$, so that they can be swung up against the seat $l$, as shown in dotted lines in Fig. 2, to be carried about when not in work. A rope or chain, $m$, will be employed to hold them in such position by fastening around the seat-standards $n$. The seat, being extended nearly the whole breadth of the harrow between standards $n$, will be springy and easy to the driver.

In order to weight the harrow with stones, to cause the teeth to run deeply in the earth, I propose to have ring or eye studs $p$, attached at suitable places, by which to attach chains $q$ for fastening them on the beams near the rear ends.

By suspending the front ends of the beams on the truck and employing weights for regulating the depth of the teeth, I can vary the harrow for different soils and other conditions at will.

Having thus fully described my invention, I claim as new and desire to secure by Letters Patent—

In a harrow, the combination of straight tooth-beams arranged parallel to each other and to the line of draft, and teeth made flat, twisted alternately to the right and left, and having their shanks parallel to the beams, whereby the teeth will set at an oblique angle to the line of draft and operate on the earth as described.

KITTIL ANUNSEN.

Witnesses:
JAS. H. JONES,
HENRY FITZGIBBON.